United States Patent
Jevans et al.

(10) Patent No.: US 8,683,088 B2
(45) Date of Patent: Mar. 25, 2014

(54) PERIPHERAL DEVICE DATA INTEGRITY

(75) Inventors: David Jevans, Menlo Park, CA (US); Gil Spencer, Los Gatos, CA (US)

(73) Assignee: Imation Corp., Oakdale, MN (US)

(*) Notice: Subject to any disclaimer, the term of this patent is extended or adjusted under 35 U.S.C. 154(b) by 118 days.

(21) Appl. No.: 12/537,172

(22) Filed: Aug. 6, 2009

(65) Prior Publication Data

US 2011/0035513 A1    Feb. 10, 2011

(51) Int. Cl.
*G06F 3/00* (2006.01)

(52) U.S. Cl.
USPC .......... 710/13; 710/8; 710/9; 710/10; 710/11; 710/12

(58) Field of Classification Search
None
See application file for complete search history.

(56) References Cited

U.S. PATENT DOCUMENTS

| | | | |
|---|---|---|---|
| 4,578,530 A | 3/1986 | Zeidler | |
| 5,010,571 A | 4/1991 | Katznelson | |
| 5,341,339 A | 8/1994 | Wells | |
| 5,404,485 A | 4/1995 | Ban | |
| 5,457,746 A | 10/1995 | Dolphin | |
| 5,479,638 A | 12/1995 | Assar et al. | |
| 5,857,021 A | 1/1999 | Kataoke et al. | |
| 5,937,425 A | 8/1999 | Ban | |
| 6,032,227 A | 2/2000 | Shaheen et al. | |
| 6,081,875 A * | 6/2000 | Clifton et al. | 711/162 |
| 6,092,196 A | 7/2000 | Reiche | |
| 6,094,721 A | 7/2000 | Eldridge et al. | |
| 6,118,874 A | 9/2000 | Okamoto et al. | |
| 6,223,284 B1 | 4/2001 | Novoa | |
| 6,292,899 B1 | 9/2001 | McBride | |
| 6,539,480 B1 | 3/2003 | Drews | |
| 6,731,536 B1 | 5/2004 | McClain | |
| 6,763,468 B2 | 7/2004 | Gupta et al. | |
| 6,776,332 B2 | 8/2004 | Allen et al. | |
| 6,791,877 B2 | 9/2004 | Miura et al. | |
| 6,834,795 B1 | 12/2004 | Rasmussen et al. | |
| 6,901,493 B1 * | 5/2005 | Maffezzoni | 711/162 |
| 6,920,527 B2 | 7/2005 | Cloutier et al. | |
| 6,961,852 B2 | 11/2005 | Craft | |

(Continued)

FOREIGN PATENT DOCUMENTS

| | | | |
|---|---|---|---|
| KR | 2005078027 | * | 8/2005 |
| WO | WO 02/47081 A2 | | 6/2002 |

OTHER PUBLICATIONS

"Hybrid Cloud Integration and Monitoring with IBM WebSphere Cast Iron", by Andre R Araujo, Jag Dhillon, Karen Durston, Sunil Joshi, David Kwock, Sean Liu, Loic Marsollier, Dec. 2012.*

(Continued)

*Primary Examiner* — Henry Tsai
*Assistant Examiner* — Jing-Yih Shyu
(74) *Attorney, Agent, or Firm* — Dorsey & Whitney LLP (57) ABSTRACT

A system and method for protecting against corruption of data stored in a peripheral storage device. The peripheral storage device is communicatively coupled with a host computer. The peripheral storage device includes at least memory and a controller. Data from the host computer is stored to a first portion of the peripheral storage device memory. The controller backs up some or all of the data to a second portion of the data to a second portion of the peripheral storage device memory. The controller restores some or all of the data from the second portion of the peripheral storage device memory to the first portion of the peripheral storage device memory.

50 Claims, 5 Drawing Sheets

(56) References Cited

U.S. PATENT DOCUMENTS

| | | | |
|---|---|---|---|
| 6,987,927 B1 | 1/2006 | Battaglia et al. | |
| 6,993,661 B1 | 1/2006 | Garfinkel | |
| 7,224,209 B2 | 5/2007 | Hsu | |
| 7,266,699 B2 | 9/2007 | Newman et al. | |
| 7,272,723 B1 | 9/2007 | Abbott et al. | |
| 7,275,139 B1 | 9/2007 | Tormasov et al. | |
| 7,278,025 B2 | 10/2007 | Saito et al. | |
| 7,305,387 B2 | 12/2007 | Poyourow | |
| 7,330,977 B2* | 2/2008 | Cromer et al. | 713/189 |
| 7,360,091 B2 | 4/2008 | Aikawa et al. | |
| 7,370,166 B1 | 5/2008 | Ramesh et al. | |
| 7,412,420 B2 | 8/2008 | Holdsworth | |
| 7,461,218 B2 | 12/2008 | Muthrasanallur et al. | |
| 7,475,425 B2 | 1/2009 | Bantz et al. | |
| 7,478,248 B2 | 1/2009 | Ziv et al. | |
| 7,496,714 B2 | 2/2009 | Gill et al. | |
| 7,496,765 B2* | 2/2009 | Sengoku | 713/189 |
| 7,620,761 B2* | 11/2009 | Chou et al. | 710/301 |
| 7,624,233 B2* | 11/2009 | Kavian | 711/115 |
| 7,631,158 B2* | 12/2009 | Chen | 711/162 |
| 7,631,191 B2 | 12/2009 | Glazer et al. | |
| 7,685,425 B1 | 3/2010 | Wright et al. | |
| 7,698,442 B1 | 4/2010 | Krishnamurthy et al. | |
| 7,698,480 B2 | 4/2010 | Bychkov et al. | |
| 7,757,088 B2 | 7/2010 | Abdulhayoglu | |
| 7,809,908 B2* | 10/2010 | Chen | 711/162 |
| 7,831,045 B2 | 11/2010 | Junod | |
| 7,926,054 B2 | 4/2011 | Sonderegger et al. | |
| 8,015,606 B1 | 9/2011 | Jevans et al. | |
| 2001/0045451 A1 | 11/2001 | Tan et al. | |
| 2002/0029215 A1 | 3/2002 | Whitmyer, Jr. | |
| 2002/0044663 A1 | 4/2002 | King et al. | |
| 2002/0046342 A1 | 4/2002 | Elteto et al. | |
| 2003/0005336 A1 | 1/2003 | Poo et al. | |
| 2003/0041253 A1 | 2/2003 | Matsui et al. | |
| 2003/0149670 A1 | 8/2003 | Cronce | |
| 2003/0149854 A1 | 8/2003 | Yoshino et al. | |
| 2003/0154337 A1 | 8/2003 | Ohno et al. | |
| 2003/0159053 A1 | 8/2003 | Fauble et al. | |
| 2003/0182584 A1 | 9/2003 | Banes | |
| 2003/0204735 A1 | 10/2003 | Schnitzmeier | |
| 2003/0204754 A1 | 10/2003 | Cromer et al. | |
| 2003/0215090 A1 | 11/2003 | Saito et al. | |
| 2004/0059925 A1 | 3/2004 | Benhammou et al. | |
| 2004/0073797 A1 | 4/2004 | Fascenda | |
| 2004/0103288 A1 | 5/2004 | Ziv et al. | |
| 2004/0103325 A1 | 5/2004 | Priebatsch | |
| 2004/0123113 A1 | 6/2004 | Mathiassen et al. | |
| 2004/0135241 A1* | 7/2004 | Conner et al. | 257/679 |
| 2004/0146015 A1 | 7/2004 | Cross et al. | |
| 2004/0148333 A1 | 7/2004 | Manion et al. | |
| 2004/0177258 A1 | 9/2004 | Ong | |
| 2004/0188710 A1 | 9/2004 | Koren et al. | |
| 2005/0015540 A1 | 1/2005 | Tsai et al. | |
| 2005/0020315 A1 | 1/2005 | Robertson | |
| 2005/0044377 A1 | 2/2005 | Huang | |
| 2005/0055519 A1 | 3/2005 | Stuart et al. | |
| 2005/0182973 A1 | 8/2005 | Funahashi et al. | |
| 2005/0206353 A1* | 9/2005 | Sengoku | 323/210 |
| 2006/0016875 A1 | 1/2006 | Bonalle et al. | |
| 2006/0021059 A1 | 1/2006 | Brown et al. | |
| 2006/0041932 A1 | 2/2006 | Cromer et al. | |
| 2006/0047717 A1 | 3/2006 | Pereira | |
| 2006/0069840 A1 | 3/2006 | Corbett et al. | |
| 2006/0095688 A1 | 5/2006 | Kawamura et al. | |
| 2006/0117393 A1 | 6/2006 | Merry et al. | |
| 2006/0129830 A1 | 6/2006 | Haller et al. | |
| 2006/0143476 A1 | 6/2006 | McGovern | |
| 2006/0149915 A1 | 7/2006 | Maly | |
| 2006/0179309 A1 | 8/2006 | Cross et al. | |
| 2006/0184806 A1 | 8/2006 | Luttmann et al. | |
| 2006/0208066 A1 | 9/2006 | Finn et al. | |
| 2006/0224742 A1 | 10/2006 | Shahbazi | |
| 2006/0236363 A1 | 10/2006 | Heard et al. | |
| 2007/0005913 A1 | 1/2007 | Muthrasanallur et al. | |
| 2007/0016743 A1 | 1/2007 | Jevans | |
| 2007/0016756 A1 | 1/2007 | Hsieh et al. | |
| 2007/0028033 A1 | 2/2007 | Hsieh et al. | |
| 2007/0033330 A1 | 2/2007 | Sinclair et al. | |
| 2007/0038802 A1 | 2/2007 | Tsai et al. | |
| 2007/0056043 A1 | 3/2007 | Onyon et al. | |
| 2007/0067620 A1 | 3/2007 | Jevans | |
| 2007/0083939 A1 | 4/2007 | Fruhauf et al. | |
| 2007/0101434 A1 | 5/2007 | Jevans | |
| 2007/0113228 A1 | 5/2007 | Raghunath et al. | |
| 2007/0118898 A1 | 5/2007 | Morgan et al. | |
| 2007/0143530 A1 | 6/2007 | Rudelic et al. | |
| 2007/0143532 A1 | 6/2007 | Gorobets et al. | |
| 2007/0156985 A1* | 7/2007 | Tsai et al. | 711/162 |
| 2007/0160198 A1 | 7/2007 | Orsini et al. | |
| 2007/0180509 A1 | 8/2007 | Swartz et al. | |
| 2007/0181698 A1 | 8/2007 | Wilson | |
| 2007/0192610 A1 | 8/2007 | Chun et al. | |
| 2007/0250919 A1 | 10/2007 | Shull et al. | |
| 2007/0266421 A1 | 11/2007 | Vaidya et al. | |
| 2007/0300031 A1 | 12/2007 | Jevans et al. | |
| 2007/0300052 A1 | 12/2007 | Jevans | |
| 2008/0005561 A1 | 1/2008 | Brown et al. | |
| 2008/0040613 A1 | 2/2008 | Challener | |
| 2008/0046990 A1 | 2/2008 | Narayanaswami et al. | |
| 2008/0082813 A1 | 4/2008 | Chow et al. | |
| 2008/0192928 A1* | 8/2008 | Yu et al. | 380/44 |
| 2008/0209132 A1* | 8/2008 | Chen | 711/141 |
| 2008/0229023 A1 | 9/2008 | Plamondon | |
| 2008/0229024 A1 | 9/2008 | Plamondon | |
| 2008/0229025 A1 | 9/2008 | Plamondon | |
| 2008/0256536 A1 | 10/2008 | Zhao et al. | |
| 2008/0288766 A1 | 11/2008 | Inoue et al. | |
| 2009/0132752 A1* | 5/2009 | Poo et al. | 711/103 |
| 2009/0222117 A1 | 9/2009 | Kaplan et al. | |
| 2009/0276534 A1 | 11/2009 | Jevans | |
| 2009/0276623 A1 | 11/2009 | Jevans | |
| 2009/0300710 A1 | 12/2009 | Chai et al. | |
| 2009/0307451 A1 | 12/2009 | Abzarian et al. | |
| 2010/0228906 A1 | 9/2010 | Mothilal et al. | |
| 2010/0250796 A1* | 9/2010 | Jevans et al. | 710/36 |
| 2011/0035574 A1 | 2/2011 | Jevans | |

OTHER PUBLICATIONS

Stallings. "Cryptography and Network Security," 2003, Prentice Hall, pp. 258-265, 318-320, and 385.
Lam, "Freshness Assurance of Authentication Protocols," 1992, Proceedings ESORICS '92, pp. 1-13.
Kim, Jesung et al. "A Space-Efficient Flash Translation Layer for compact Flash Systems," *IEEE Transactions on Consumer Electronics*, vol. 48, No. 2, May 2002.
Denning, Dorothy E. et al. "A Taxonomy for Key Escrow Encryption Systems," *Communications of the ACM*, vol. 39, No. 3, pp. 34-40 (Mar. 1996).
Tal, Arie. "Two Technologies Compared: NOR v. NAND", White Paper, 01-SR-012-04-8L, Rev. 1.1, Jul. 2003, pp. 1-14.
National Institute of Standards and Technology. "Federal Information Processing Standards Publication 197." Nov. 2001.
Kingston. "Kingston Data Traveler Elite: Advanced Security and High Performance." Oct. 2004. http://www.kingstom.com/digitalmedia/dt_elite.wp.pdf.
Army Regulation 380-19. "Information Systems Security." Feb. 27, 1998. Department of the Army. Appendix F. pp. 28-30.
Sedaghat et al. "A Dynamic Web Agent for Verifying the Security and Integrity of a Web Site's Contents," IEEE, Aug. 2002.
Gutmann, Peter. "Secure Deletion of Data from Magnetic and Solid-State Memory." USENIX. Sixth USENIX Security Symposium Proceedings, San Jose, California, Jul. 1996. http://www.cs.auckland.ac.nz/~pgut001/pubs/secure_del.html.
Fischer, Viktor et al. "True Random Number Generator Embedded in Reconfigurable Hardware." Springer-Verlag. Lecture Notes in Computer Science. vol. 2523, pp. 415-430. 2003.

* cited by examiner

PERIPHERAL DEVICE DATA INTEGRITY

CROSS-REFERENCES TO RELATED APPLICATIONS

The present application is related to U.S. Provisional Patent Application No. 61/126,473 filed May 2, 2008 and entitled "Enterprise Device Recovery," U.S. patent application Ser. No. 12/434,628 filed May 2, 2009 and entitled "Enterprise Device Recovery," U.S. patent application Ser. No. 12/412,844 filed Mar. 27, 2009 and entitled "Establishing a Secure Channel Between a Server and a Portable Storage Device," and U.S. patent application Ser. No.12/537,194 filed concurrently herewith and entitled "Running a Computer from a Secure Portable Device," the disclosures of which are incorporated herein by reference.

BACKGROUND OF THE INVENTION

1. Field of the Invention

The present invention relates generally to peripheral devices. More specifically, the present invention relates to maintaining the integrity of data on a peripheral storage device.

2. Related Art

It is typically desirable to maintain the integrity of data stored in data storage devices and other peripheral devices. Corruption of memory at the application level is often an issue in data storage devices. Corruption can occur when less than all the appropriate data is written during an update of an area of memory. These problems can occur readily due to events such as device contention, surprise eject, forceful application termination, and application malfunctioning, whether crashing or otherwise.

Additional copies of the data that are made are typically called "backups." The term "backup," in this context, refers to making copies of data so that these additional copies may be used to restore the original after a data loss event (e.g., data corruption).

Presently, data can be stored on a peripheral device, such as a secure data storage device (an external hard drive or a Universal Serial Bus (USB) flash drive, for example). These devices can be coupled to a host computer. However, data corruption can occur. For example, if a device is disconnected from a host computer without initially performing a clean ejection, then data can be corrupted. Consequently, there is a need in the art for an improved system and method for maintaining the integrity of data stored on a peripheral storage device.

SUMMARY OF THE INVENTION

Embodiments of the present invention allow for protecting against corruption of data stored on a peripheral storage device, such as a USB flash drive for example. PCI Data Security Standard (PCI DSS), Ethernet, etc., couplings are also contemplated. In some exemplary embodiments, the data can include at least a portion of an operating system (OS) or a virtual machine (VM).

In a first claimed embodiment, a method is disclosed for protecting against corruption of data stored in a peripheral storage device. The peripheral storage device is communicatively coupled with a host computer. The peripheral storage device includes at least memory and a controller. Data from the host computer is stored to a first portion of the peripheral storage device memory. The controller backs up some or all of the data to a second portion of the data to a second portion of the peripheral storage device memory. The controller also restores some or all of the data from the second portion of the peripheral storage device memory to the first portion of the peripheral storage device memory.

In a second claimed embodiment, a system is set forth for protecting against corruption of data stored in a peripheral storage device. The system includes a peripheral storage device with at least memory and a controller. The memory includes a first portion of memory and a second portion of memory. The system further includes a host computer communicatively coupled with the peripheral storage device. The system also includes a controller configured to backup some or all of the data to the second portion of the peripheral storage device memory, and configured to restore some or all of the data from the second portion of the peripheral storage device memory to the first portion of the peripheral storage device memory.

A third claimed embodiment includes a computer readable storage medium having a program embodied thereon. The program is executable by a processor to perform a method for protecting against corruption of data stored in a peripheral storage device. The method includes communicatively coupling the peripheral storage device with a host computer, the peripheral storage device comprising at least memory and a controller; storing data from the host computer to a first portion of the peripheral storage device memory; the controller backing-up some or all of the data to a second portion of the peripheral storage device memory; and the controller restoring some or all of the data from the second portion of the peripheral storage device memory to the first portion of the peripheral storage device memory.

DETAILED DESCRIPTION OF EXEMPLARY EMBODIMENTS

The present invention provides methods and systems for protecting against data corruption on a peripheral storage device, such as, for example, corruption of an OS or VM run from a peripheral storage device. In one embodiment, the peripheral device is a portable storage device, such as a USB flash drive, for example.

As described herein, the device can be coupled to a host computer. If the device disconnected from the host computer without initially performing a clean ejection, then data can be corrupted. (A "clean ejection" refers to the instance where the host computer and operating system, or virtual machine, are shut down properly, and the peripheral device was not removed from the host computer (or the power to the peripheral device shut off) before an ejection.) The device may be running an OS or VM image on a host computer, as discussed in "Running a Computer from a Secure Portable Device."

Consequently, there is a need in the art for an improved system and method for protecting against data corruption on a peripheral storage device.

Figure 1:
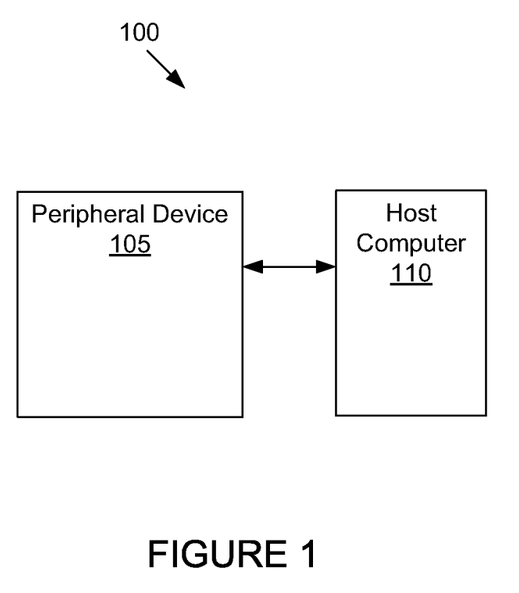
FIG. 1 is a block diagram of an exemplary environment for practicing embodiments of the present invention.

Referring now to FIG. 1, a block diagram of an exemplary environment 100 is presented. As depicted, the environment 100 includes a peripheral storage device 105 and a host computer 110. The peripheral storage device 105 is communicatively coupled with the host computer 110. It is noteworthy that communicative couplings may be wireless or wired. In some exemplary embodiments, the communicative coupling is done over a secure channel, or secure communication path.

In one embodiment, the peripheral storage device 105 can be a secure peripheral storage device (e.g., encrypted) and include a device secure channel engine. The host computer 110, in one embodiment, is communicatively coupled with a network and a server. The server includes a server secure channel engine.

Figure 2:
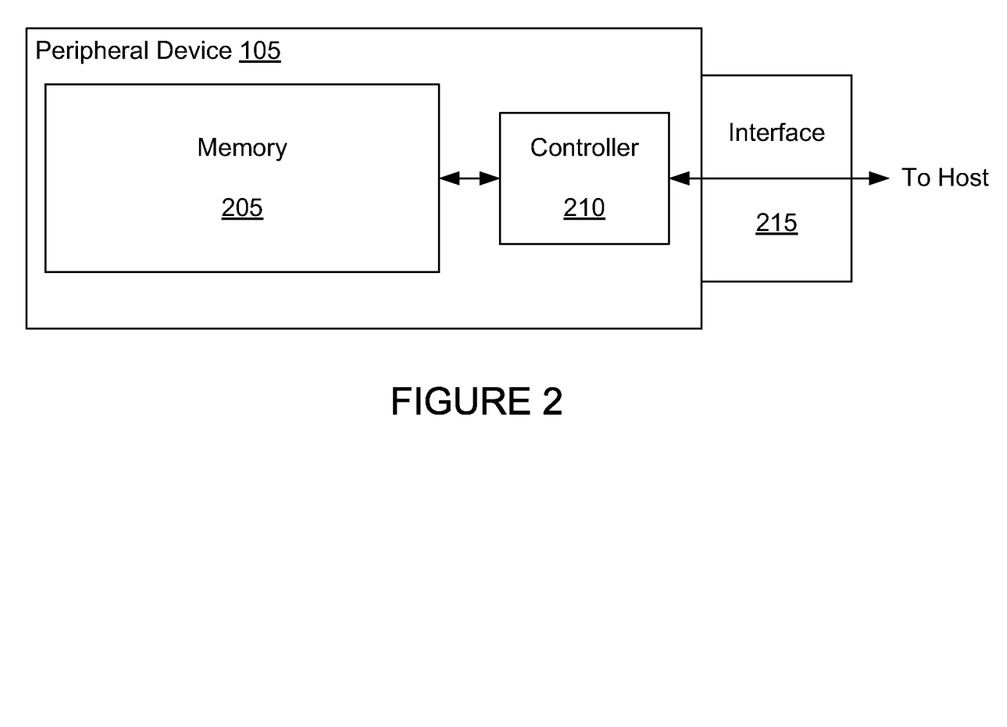
FIG. 2 is a block diagram of an exemplary peripheral device employed in the environment of FIG. 1.

The device secure channel engine includes a device cryptography module, a challenge generation module, a verification module, and a device storage module. Execution of the device cryptography module allows the controller 210 (e.g. a processor) to encrypt and decrypt information stored by the memory 205 and transferred between the peripheral storage device 105 and the server, for example. In exemplary embodiments, the device cryptography module implements one or more of a variety of cryptographic technologies. Examples of cryptographic technologies include symmetric algorithms such as Twofish, Serpent, AES (Rijndael), Blowfish, CAST5, RC4, TDES, and IDEA, as well as asymmetric algorithms that use one key to encrypt given information and another key to decrypt that information. Those skilled in the art will be familiar with symmetric and asymmetric approaches to cryptography. The device cryptography module may also be executable to concatenate information transferred between the peripheral storage device 105 and a server. Concatenation may be achieved through usage of message authentication code (MAC). Generally speaking, MAC describes a hashing mechanism with an associated secret that is used to identify a piece of data.

Execution of the challenge generation module allows the controller 210 to generate a server challenge. The server challenge may include a set of random numbers and be used to confirm an identity of the server. Furthermore, the server challenge is generated through execution of the challenge generation module on numerous occasions. For example, the server challenge may be generated each time a secure channel is established between the peripheral storage device 105 and the server.

Execution of the verification module allows the controller 210 to verify various information sent by the server to the peripheral storage device 105. In exemplary embodiments, the verification module is executable to verify signatures applied by the server to transferred information. The verification module may also be executable to verify that a server challenge received back from the server is consistent with a corresponding server challenge initially sent from the peripheral storage device 105 to the server. Additionally, it may be necessary to decrypt such a server challenge returned from the server. Decryption of the server challenge is achieved through execution of the device cryptography module.

The device storage module may be configured to manage information associated with formation of a secure channel between the peripheral storage device 105 and the server. This information may be stored on the controller 210 or the memory 205, and is accessed through execution of the device storage module. In exemplary embodiments, this information includes a device token. The device token may be created when the peripheral storage device 105 is fabricated or at a later time. The device token may include a unique device identification (ID). The device ID includes a series of bytes that identify the peripheral storage device 105 in exemplary embodiments. In addition, the device token may include a public key. In general, public key cryptography is a method for secret communication between two parties without requiring an initial exchange of secret keys. The public key may be one of a set of keys that includes the public key and a private key. The private key may be retained by the peripheral storage device 105. The public key and the private key may be used by the device cryptography module to encrypt and decrypt information stored by the memory 205 and transferred between the peripheral storage device 105 and the server.

The server secure channel engine, or certain modules thereof, may be included in the memory and/or storage of the server. The server secure channel engine includes a server cryptography module, a shared secret generation module, a signature module, and a server storage module.

Execution of the server cryptography module allows the processor of the server to encrypt and decrypt information stored by the memory and storage of the server and transferred between the peripheral storage device 105 and the server. Much like device cryptography module, the server cryptography module implements one or more of a variety of cryptographic technologies in accordance with exemplary embodiments. The server cryptography module may also be executable to concatenate information transferred between the peripheral storage device 105 and the server.

Execution of the shared secret generation module allows the processor of the server to generate a shared secret. This shared secret may be distributed to the peripheral storage device 105. The shared secret includes an AES key concatenated with a MAC in exemplary embodiments. Those skilled in the art will be familiar with AES keys.

Execution of the signature module allows the processor of the server to digitally sign certain information transferred to the peripheral storage device 105. In exemplary embodiments, the signature module may utilize an RSA signature. RSA is an algorithm for public key cryptography that is suitable for signing as well as encryption.

The server storage module may be configured to manage information associated with a secure channel formed between the peripheral storage device 105 and the server. This information may be stored by the memory or storage of the server, and is accessed through execution of the server storage module. In exemplary embodiments, this information includes information associated with the peripheral storage device 105. For example, this information may include the device ID of the peripheral storage device 105.

The secure channel (or secure communication path), including the device secure channel engine and the server secure channel engine, are described more fully in "Establishing a Secure Channel Between a Server and a Portable Storage Device," which was referenced above.

It is contemplated that the peripheral storage device 105 can include any device that is capable of storing digital information. In one embodiment according to aspects of the present invention, the peripheral storage device 105 can be a removable or unpluggable data storage device (e.g., a USB drive). The peripheral storage device 105 can be portable in one embodiment, but it is not limited to being a portable device. The peripheral storage device 105 can be an encrypted device (e.g., hardware encrypted). The peripheral storage device 105 can also be encrypted in software or firmware in other embodiments. For illustrative purposes, the peripheral storage device 105 is described herein in the context of a secure USB flash drive. The peripheral storage device 105 is discussed in further detail in connection with FIG. 2.

The host computer 110 includes any computing device that can interface with the peripheral storage device 105. Examples of the host computer 110 include a personal computer (PC), a personal digital assistant (PDA), a Smartphone, and other various devices. The host computer 110 includes one or more communications interfaces (not depicted) to facilitate communicative coupling with the peripheral storage device 105. Additionally, the host computer 110 can include a processor, memory such as random access memory (RAM), and storage such as read-only memory (ROM) (which are not depicted). Those skilled in the art will be familiar with the components and functionality of computing devices such as the host computer 110.

The host computer 110 can include a control panel (not depicted). According to exemplary embodiments, the control panel can be effectuated by instructions that are executed by the processor of the host computer 110. The control panel can also allow a user to manage digital information stored within the peripheral storage device 105.

These instructions can be stored within the peripheral storage device 105 and retrieved by the host computer 110 for execution. In one embodiment, these instructions can be stored as software in a control panel module in the peripheral storage device 105. However, it is contemplated that the instructions can be stored as software, firmware, hardware, as a combination, or in various other ways. It is also envisioned that the instructions associated with the control panel can be stored by the host computer 110, or stored remotely and accessed by the host computer 110 via a network.

FIG. 2 is a block diagram of the exemplary peripheral storage device 105 employed in the environment 100 of FIG. 1. The peripheral storage device 105 can be any device that is that is used to store digital information, and in one embodiment the peripheral storage device 105 is portable. In one embodiment, the peripheral storage device 105 depicted in FIG. 2 includes a memory 205, a controller 210, and an interface 215, which is a USB interface in one embodiment.

The memory 205 can include a computer-readable storage medium. While common forms of computer-readable storage media include, for example, a floppy disk, a flexible disk, a hard disk, magnetic tape, any other magnetic medium, a CD-ROM disc, digital video disc (DVD), and any other optical medium, the memory 205 is described in the context of non-volatile memory that can be electrically erased and rewritten. Examples of such non-volatile memory include NAND flash and NOR flash. Additionally, the memory 205 can comprise other existing memory technologies. The memory 205 can also comprise various other memory technologies as they become available in the future.

The controller 210 can be a processor or microcontroller with an amount of on-chip ROM and/or RAM. The controller 210 is communicatively coupled with the memory 205 and the interface 215. Additionally, the controller 210 can include software and/or firmware that can execute various modules, such as modules described herein. As such, the controller 210 functions as an intermediary between the host computer 110 and the memory 205. For example, the controller 210, or various modules executed thereby, can receive write commands from the host computer 110 and determine how data associated with those write commands is to be managed with respect to the memory 205.

As mentioned, the peripheral storage device 105 can be communicatively coupled with the host computer 110 in either a wireless or wired manner. The interface 215 facilitates this coupling by allowing information to be transferred between the peripheral storage device 105 and the host computer 110. In exemplary embodiments, the interface 215 includes a USB plug that is insertable into a mating USB port of the host computer 110. Alternatively, the interface 215 can include other standards for communicative coupling such as FireWire, Ethernet, Wireless USB, ESATA, Bluetooth, or other standards. Furthermore, the interface 215 can comprise other interface technologies as they become available.

Figure 3:
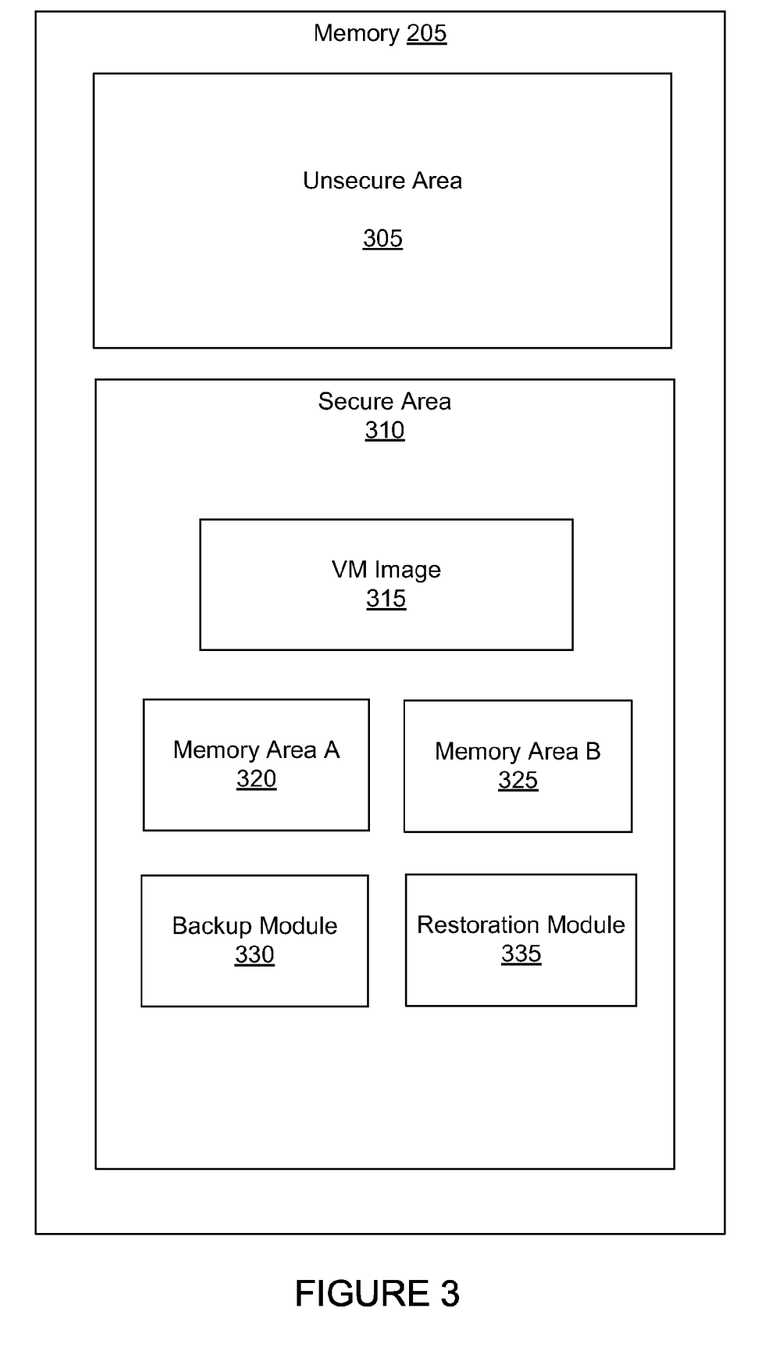
FIG. 3 is a block diagram of an exemplary memory included in the peripheral device of FIG. 2.

In keeping with embodiments according the present invention, FIG. 3 is a block diagram of the exemplary memory 205 included in the peripheral storage device 105 of FIG. 2. The memory 205 includes an unsecure area 305 such as a CD volume or CD partition, for example. The memory 205 also includes a secure area 310 such as a secure volume or secure partition, for example. In one embodiment, the secure area 310 is encrypted.

As used herein, the term "unsecure area" can mean an area of memory of the peripheral storage device 105 that is completely unsecure. Alternatively, the term "unsecure area" can refer to an area of memory of the peripheral storage device 105 that includes some level of protection to prevent a user from updating the area. In one embodiment, "unsecure area" can be an area of memory emulating a CD-ROM.

As used herein, the term "secure area" can refer to an area of memory of the peripheral storage device 105 that is encrypted in order to keep unauthorized users from accessing the area. In one embodiment, the term "secure area" can refer to a secure volume on the peripheral storage device 105. In one embodiment, the term "secure area" can refer to an area of memory that is unwritable to one or more users.

A VM image 315, which is considered to be a guest OS, is stored in the secure area 310. In an alternate embodiment, the virtual machine image 315 is stored in the unsecure area 305.

The secure area 310 of the memory 205 includes a first portion of memory, such as a memory area A 320. The secure area 310 of the memory 205 further includes a backup portion of memory, such as a memory area B 325. As described herein, the memory area A 320 can be backed-up to the memory area B 325 by the backup module 330. Thus, if the contents of the memory area A 320 become corrupted then the contents of the memory area B 325 can be copied back to memory area A by the restoration module 335 upon either a command from the host computer 110 or as determined by the controller 210. This is referred to as "restoring" or "restoration." The contents of the memory area A 320 and the contents of the memory area B 325 can include files, VM images, OSes, applications, various types of data, etc. The contents can be encrypted, in one embodiment. In another embodiment, the memory area A 320 and the memory area B 325 can be located in the unsecure area 305. As described herein, at various times the memory area A 320 can be the backup area for the memory area B 325. The memory area A 320 and the memory area B 325 can include blocks of NAND flash, for example.

It is contemplated that the backing-up and restoring can be accomplished by the controller 210 and/or the backup module 330 and the restoration module 335. In one embodiment, the backup module 330 and/or the restoration module 335 can be stored on the controller 210.

Figure 4:
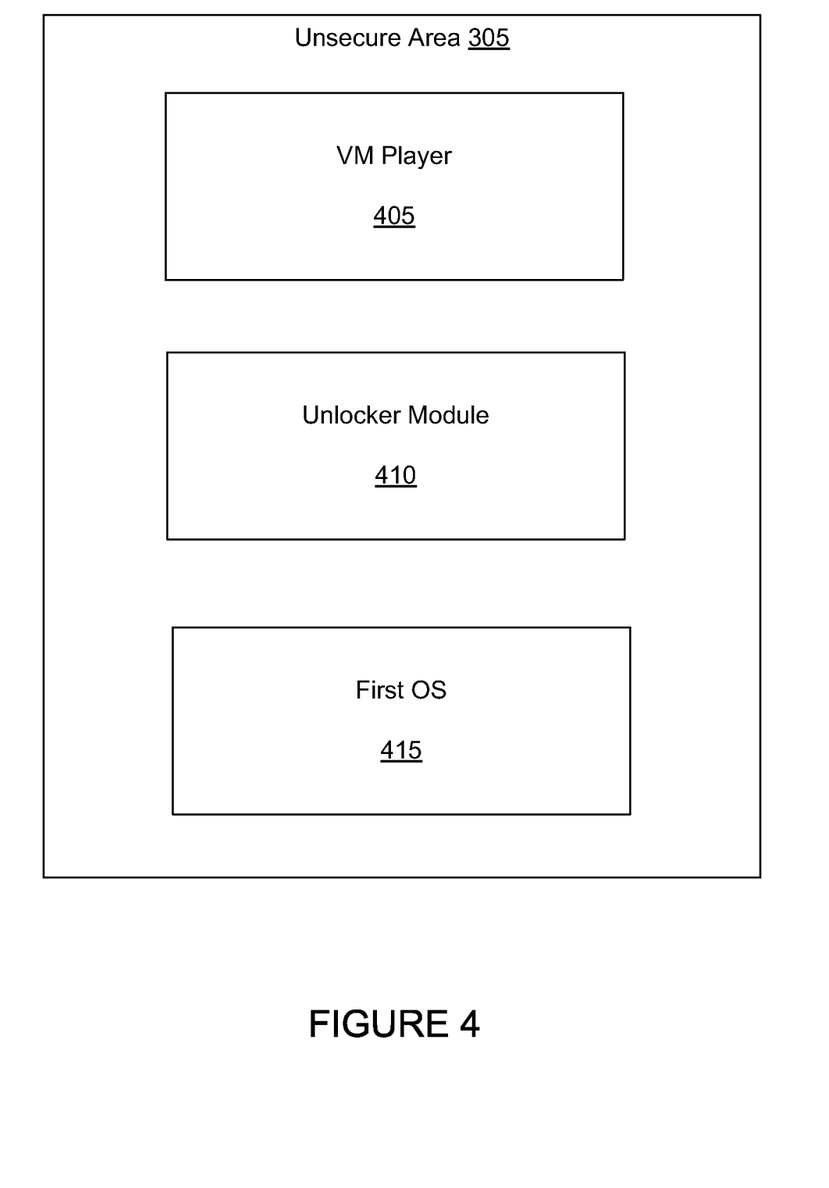
FIG. 4 is a block diagram of an exemplary unsecure area included in the peripheral device of FIG. 2.

FIG. 4 is a block diagram of the exemplary unsecure area 305 included in the peripheral device of FIG. 2. The unsecure area 305 includes a VM player 405, an unlocker module 410, and a first OS 415 (which could be considered a host OS and could be a small OS in one embodiment). Modules mentioned herein, such as those included in the unsecure area 305 and secure area 310, can be stored as software, firmware, hardware, as a combination, or in various other ways. It is contemplated that various modules can be removed or included in other suitable locations besides those locations specifically disclosed herein. In various embodiments, additional modules can be included in the exemplary system described herein. It is envisioned that in various embodiments the first OS 415 is not required.

In keeping with embodiments according to the present invention, the VM player 405 is configured to run the VM image 315, which is considered to be a guest OS as mentioned herein. In one embodiment, the VM image 315 is specifically node-locked to the VM player 405. The unlocker module 410 is configured to unlock the secure area 310 of the memory 205. The unlocker module 410 is further configured to launch the VM player 405 on the first OS 415. In other embodiments, the first OS 415 launches the VM player 405. In one embodiment, the first OS 415 runs a program that calls the unlocker module 410. The program might check to see if the secure area 310 is opened first, and if it is, indicate that no unlocking is currently needed. In another embodiment, a launching module is used to launch the VM player 405.

In "Running a Computer from a Secure Portable Device," which has been incorporated herein, more information is disclosed regarding booting a VM or secondary OS from a peripheral storage device.

Figure 5:
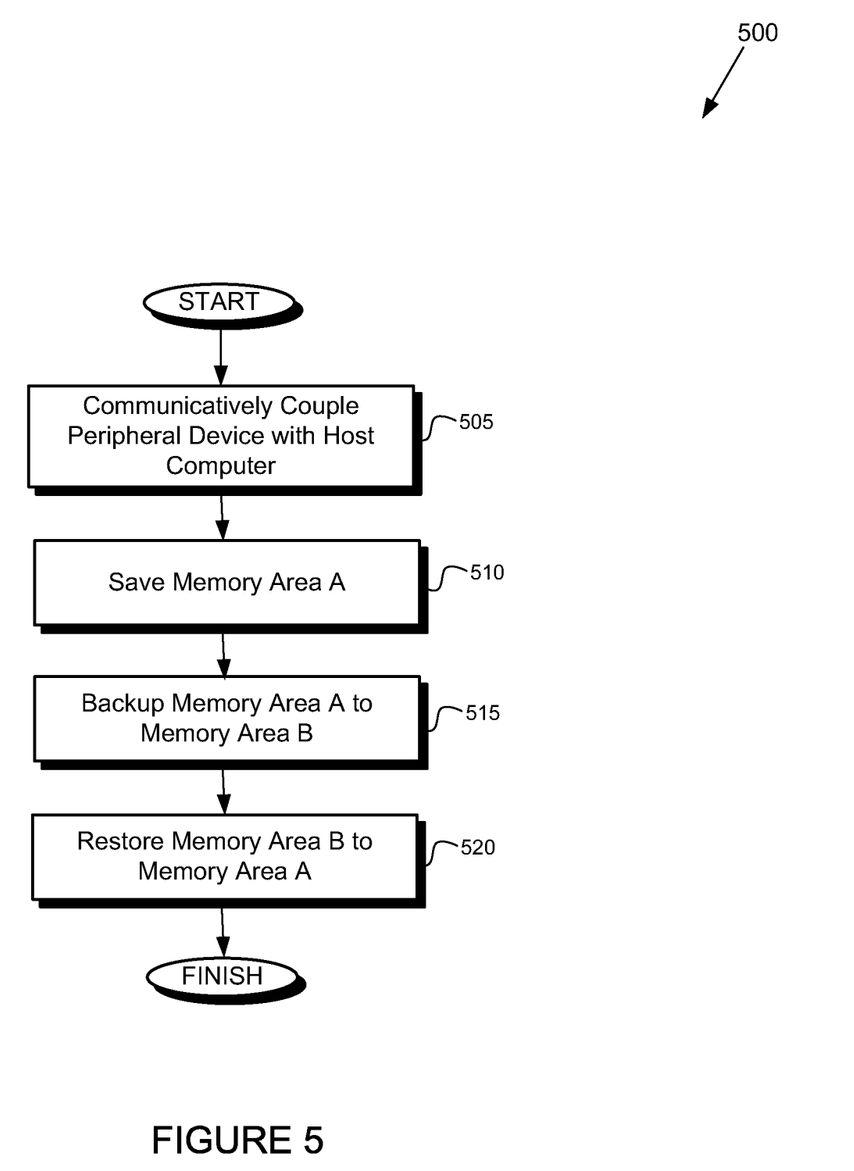
FIG. 5 is a flowchart of an exemplary method for protecting against data corruption of an operating system run from a peripheral storage device.

FIG. 5 is a flowchart of an exemplary method for protecting against data corruption of an OS run from the peripheral storage device 105. The OS can be run natively or virtually from the peripheral storage device 105. At step 505, the peripheral storage device 105 is communicatively coupled with the host computer 110, thus forming a secure channel.

At step 510, the memory area A 320 is saved (written) to the memory 205 of the peripheral storage device 105. The memory area A 320 might contain a portion of an OS, or an entire OS, for example. The memory area A 320 is then optionally flagged as being in a known good state. A pointer is set to point to the memory area A 320, indicating that the memory area A 320 is to be used (e.g. run) and is not considered a backup. The OS stored in the memory area A 320 is then run.

At step 515, the pointer is still pointing to the memory area A 320. A clean ejection command from the host computer 110 is received by the peripheral storage device 105. Before ejection, the contents of the memory area A 320 are copied (i.e. backed up) to the memory area B 325. The memory area B 325 is then optionally flagged as good.

At step 520, if there is corruption of the contents of the memory area B 325 (e.g. a user disconnects the peripheral storage device 105 from the host computer 110) before completion of saving to the memory area B 325 then restoration is performed. In this case, the memory area A 320 is copied to the memory area B 325. The memory area B 325 is then optionally flagged as being in a known good state after the backup is complete and verified. The pointer still points to the memory area A 320. The memory area B 325 is considered to be the backup.

The OS in the memory area A 320 is then run. If corruption of the memory area A 320 is detected then the system restores by copying the memory area B 325 to the memory area A 320. The memory area A 320 is optionally flagged as being in a known good state when the backup is complete and verified. The pointer then points to the memory area B 325, and the memory area A 320 is considered to be the backup.

The OS in the memory area B 325 is then run. If corruption of the memory area B 325 is detected, then a restore is performed and the memory area A 320 is copied to the memory area B 325. When the backup is complete and verified, the memory area B 325 is optionally marked as good. The pointer is then set to point to the memory area A 320.

In one embodiment, the backups are verified before changing the pointer. In another embodiment the backups are not verified before changing the pointer.

In another embodiment, when the system performs a backup of, say, the memory area A 320 to the memory area B 325, the pointer then points to the memory area B 325 and the system runs the memory area B 325 with the memory area A 320 being considered a backup.

Backing up and restoring can be performed manually in one embodiment. In another embodiment the backing up can be performed automatically at checkpoints. The checkpoints can occur every time a lock or unlock command is received in one embodiment. Alternatively, the checkpoints can occur at set intervals of time, or even randomly. Any other suitable checkpoints can be used in accordance with the present invention.

Backing-up can be performed at a startup time of the peripheral storage device 105 if the peripheral storage device 105 was cleanly ejected or shutdown previously. Monitoring of whether the peripheral storage device 105 and a host operating system were shutdown cleanly can be performed by the peripheral storage device and the host computer.

There are various ways to verify if an area of memory is in a known good state. For example, a hash of A and a hash of B can be taken and results compared to each other. Checksums can be used in another embodiment. Any other suitable methods can be utilized in accordance with the present invention.

In one embodiment, backing-up of the saved portion of the OS (or other content) to a backup area is performed on a subset of the saved portion of the OS. The subset of the saved portion of the operating system comprises data that was modified since a previous backup.

In another embodiment, the backup and restoration can be performed remotely, such as by backing up and restoring over a network. A wi-fi or any other suitable network can be implemented.

In yet another embodiment, a power supply can be included with the peripheral storage device 105. The power supply can be a battery, capacitor, solar cell(s), or any other suitable type of power supply. The power supply allows for backup to proceed if the device is prematurely ejected (i.e. not cleanly ejected) from the host computer 110, or if the host computer 110 is shutdown completely before backup is complete.

In yet another embodiment, compressing and decompressing can be performed during backup and recovery, respectively. Thus, less storage is used.

Another way to free up storage is to backup and verify the backup, and then delete the other copy (or the backup). Policies for this and other features can be set by an administrator, as discussed in "Enterprise Device Recovery."

Thus, a system and method have been disclosed for protecting against corruption of data, (e.g. an OS or VM) run from a peripheral storage device.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for protecting against corruption of data stored in a peripheral storage device, the method comprising:
   communicatively coupling the peripheral storage device with a host computer, the peripheral storage device comprising a portable storage device having at least memory and a controller;
   storing data from the host computer to a first portion of the peripheral storage device memory;
   the controller backing up some or all of the data to a second portion of the peripheral storage device memory;
   setting a pointer to indicate that the first portion of the peripheral storage device memory is to be used and the second portion is a backup portion;
   the controller restoring some or all of the data from the backup portion of the peripheral storage device memory to the first portion of the peripheral storage device memory to be used; and
   changing the pointer to indicate that the second portion of the peripheral storage device memory is to be used and the first portion is to be considered the backup portion;
   wherein the data is encrypted by the controller, the controller being an on-board processor included within the portable storage device.

2. The method of claim 1, wherein a password is required to unlock at least a portion of the peripheral storage device memory.

3. The method of claim 1, wherein the peripheral storage device memory includes a secure area of memory and an unsecure area of memory.

4. The method of claim 1, wherein the data comprises a virtual machine image.

5. The method of claim 1, wherein the data comprises a guest operating system.

6. The method of claim 1, the method further comprising virtual machine player software launching a virtual machine operating system inside of a virtual machine.

7. The method of claim 1, wherein the data restoration is initiated upon an occurrence or detection of data corruption of at least a portion of the data stored in the portion of the peripheral storage device memory to be used.

8. The method of claim 1, wherein the peripheral storage device memory is part of a network.

9. The method of claim 1, wherein backing up some or all of the data is performed before a clean ejection.

10. The method of claim 1, wherein backing up some or all of the data to a second portion of the peripheral storage device memory is performed on a subset of the stored data, wherein the subset of the stored data comprises data that was modified since a previous backup.

11. The method of claim 10, wherein the controller tracks blocks of flash memory that were modified since the peripheral storage device was powered-up and communicatively coupled with the host computer, and only those modified blocks of flash memory are copied to the second portion of memory.

12. The method of claim 1, wherein backing up some of all of the data is performed at a checkpoint.

13. The method of claim 1, wherein backing up some or all of the data is performed at startup time of the peripheral storage device if the peripheral storage device was cleanly ejected or shutdown previously.

14. The method of claim 13, wherein monitoring of whether the peripheral storage device and a host operating system were shutdown cleanly is performed by the peripheral storage device.

15. The method of claim 13, wherein monitoring of whether the peripheral storage device and a host operating system were shutdown cleanly is performed by the host computer.

16. The method of claim 15, wherein a state of a previous shutdown is stored on the peripheral storage device for use at a next startup time.

17. The method of claim 1, further comprising compressing some or all of the data during backing up some or all of the data.

18. The method of claim 1, further comprising decompressing data during restoration.

19. The method of claim 1, wherein the peripheral storage device includes a power source.

20. The method of claim 19, wherein the peripheral storage device performs the backing up of some or all of the data upon ejection, decoupling, or power-down of the host computer, utilizing the power source, which is on-board, for power to perform the backup without relying on power from the host computer.

21. The method of claim 19, wherein the power source is a battery.

22. The method of claim 19, wherein the power source is a solar cell.

23. The method of claim 1, wherein restoration is performed automatically by the controller.

24. The method of claim 1, wherein restoration is initiated by a command sent from the host to the controller.

25. The method of claim 24, wherein the restoration is initiated by a person interacting with a physical switch or other input mechanism on the peripheral storage device.

26. The method of claim 1, wherein the memory comprises a flash memory.

27. The method of claim 1, wherein the memory is part of a hard drive.

28. The method of claim 1, wherein the communicative coupling of the peripheral storage device with the host computer is accomplished with USB, PCI, or Ethernet.

29. The method of claim 1, wherein the restoring is initiated by a command from the host computer.

30. The method of claim 1, wherein the restoring is initiated by the controller.

31. The method of claim 1, wherein the data comprises software.

32. The method of claim 1, wherein the data comprises an operating system.

33. The method of claim 1, wherein the controller and memory are integrated into a single chip.

34. The method of claim 1, wherein the backup portion of the peripheral storage device memory is not directly accessible by the host computer.

35. The method of claim 1, wherein the backup portion of the peripheral storage device memory is only written to or used by the controller.

36. The method of claim 1, wherein the host computer boots an operating system from the peripheral storage device.

37. A system for protecting against corruption of data stored in a peripheral storage device, the system comprising:

a peripheral storage device comprising a portable storage device having at least memory and a controller, the memory including a first portion of memory and a second portion of memory;

a host computer communicatively coupled with the peripheral storage device for storing data from the host computer to the first portion of the peripheral storage device memory; and a controller configured to:
- backup some or all of the data to the second portion of the peripheral storage device memory;
- set a pointer to indicate that the first portion of the peripheral storage device memory is to be used and the second portion is a backup portion;
- restore some or all of the data from the backup portion of the peripheral storage device memory to the first portion of the peripheral storage device memory to be used; and
- change the pointer to indicate that the second portion of the peripheral memory storage device is to be used and the first portion is to be considered the backup portion;

wherein the data is encrypted by the controller, the controller being an on-board processor included within the portable storage device.

38. The system of claim 37, further comprising a backup module executable by the controller to backup some or all of the data to the second portion of the peripheral storage device memory.

39. The system of claim 38, wherein the backup module is located on the controller.

40. The system of claim 38, wherein the backup module is located in the peripheral storage device memory.

41. The system of claim 37, further comprising a restoration module executable by the controller to restore some or all of the data from the backup portion of the peripheral storage device memory to the portion of the peripheral storage device memory to be used.

42. The system of claim 41, wherein the restoration module is located on the controller.

43. The system of claim 41, wherein the restoration module is located in the peripheral storage device memory.

44. The system of claim 37, wherein the data comprises an operating system run natively from the peripheral storage device.

45. The system of claim 37, wherein the data comprises an operating system run virtually from the peripheral storage device.

46. The system of claim 37, wherein the peripheral storage device is configured to run a virtual machine image on the host computer and backup a virtual machine image on the peripheral storage device.

47. The system of claim 37, wherein the peripheral storage device is configured to run a secondary operating system on the host computer and backup a secondary operating system on the peripheral storage device.

48. The system of claim 37, wherein the peripheral storage device memory includes a secure area of memory and an unsecure area of memory.

49. The system of claim 37, wherein the peripheral storage device memory is part of a network.

50. A non-transitory computer readable storage medium having a program embodied thereon, the program executable by a processor to perform a method for protecting against corruption of data stored in a peripheral storage device, the method comprising:
- communicatively coupling the peripheral storage device with a host computer, the peripheral storage device comprising a portable storage device having at least memory and a controller;
- storing data from the host computer to a first portion of the peripheral storage device memory;
- the controller backing up some or all of the data to a second portion of the peripheral storage device memory;
- the controller setting a pointer to indicate that the first portion of the peripheral storage device memory is to be used and the second portion is a backup portion;
- the controller restoring some or all of the data from the backup portion of the peripheral storage device memory to the first portion of the peripheral storage device memory to be used;
- the controller changing the pointer to indicate that the second portion of the peripheral storage device memory is to be used and the first portion is to be considered the backup portion;

wherein the data is encrypted by the controller, the controller being an on-board processor included within the portable storage device.

* * * * *